United States Patent
Wang et al.

(10) Patent No.: US 9,183,033 B2
(45) Date of Patent: Nov. 10, 2015

(54) METHOD AND SYSTEM FOR ANALYZING ROOT CAUSES OF RELATING PERFORMANCE ISSUES AMONG VIRTUAL MACHINES TO PHYSICAL MACHINES

(71) Applicant: INDUSTRIAL TECHNOLOGY RESEARCH INSTITUTE, Hsinchu (TW)

(72) Inventors: En-Tzu Wang, Hsinchu (TW); Tzi-Cker Chiueh, Taipei (TW); Je-Jone Ko, Hsinchu (TW); Shu-Chun Yeh, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 364 days.

(21) Appl. No.: 13/707,038

(22) Filed: Dec. 6, 2012

(65) Prior Publication Data
US 2014/0165054 A1    Jun. 12, 2014

(51) Int. Cl.
G06F 9/455 (2006.01)
G06F 9/46 (2006.01)
G06F 11/00 (2006.01)
G06F 15/173 (2006.01)

(52) U.S. Cl.
CPC .. *G06F 9/45558* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 6,738,933 B2 | 5/2004 | Fraenkel et al. | |
| 7,818,418 B2 | 10/2010 | Bansal et al. | |
| 8,032,867 B2 | 10/2011 | Bansal | |
| 8,180,723 B2 | 5/2012 | Bethke et al. | |
| 8,302,079 B2 | 10/2012 | Bansal | |
| 2008/0114581 A1* | 5/2008 | Meir et al. | 703/13 |
| 2009/0028053 A1* | 1/2009 | Kannan et al. | 370/241 |
| 2012/0005658 A1 | 1/2012 | Bansal | |
| 2013/0305093 A1* | 11/2013 | Jayachandran et al. | 714/37 |

OTHER PUBLICATIONS

Nguyen et al., Pal: Propagation-Aware Anomaly Localization for Cloud Hosted Distributed Applications, Oct. 23, 2011, ACM, Managing Large-scale Systems via the Analysis of System Logs and the Application of Machine Learning Techniques (SLAML '11), pp. 1-8.*

Wong et al., "Integrated System Diagnosis and Root Cause Analysis", Proceedings of the 2010 Conference of the Center for Advanced Studies on Collaborative Research, p. 427-428, 2010.

(Continued)

*Primary Examiner* — Abdullah Al Kawsar
*Assistant Examiner* — Melissa Alfred
(74) *Attorney, Agent, or Firm* — Rabin & Berdo, P.C.

(57) ABSTRACT

According to one exemplary embodiment, a method for analyzing root causes applies an application-level dependency discovery and anomaly detection to find application-level dependencies in one or more virtual machines (VMs), and generate an application-level topology with anomaly, and then transfers the application-level topology with anomaly to a VM-level dependency, and transfers the VM-level dependency to a physical machine level (PM-level) dependency via a physical and virtual resource mapping, and eventually generates a group of event sets. A prioritized event list is generated by prioritizing the group of event sets.

18 Claims, 13 Drawing Sheets

(56) References Cited

OTHER PUBLICATIONS

Khanna et al., "Application Performance Management in Virtualized Server Environments", In proceedings of the 10th IEEE/IFIP Network Operations and Management Symposium (NOMS 2006), p. 373-381, 2006.

Wang et al., "AppRAISE: application-level performance management in virtualized server environments", In IEEE Transaction on Network and Service Management, vol. 6, No. 4, p. 240-254, Dec. 2009.

Kim et al., "An Alarm Correlation Algorithm for Network Management Based on Root Cause Analysis", In Proceedings on the 13th International Conference on Advanced Communication Technology (ICACT 2011), p. 1233-1238, 2011.

Apte et al., "Look Who's Talking: Discovering Dependencies between Virtual Machines Using CPU Utilization", In proceedings of the 2nd USENIX conference on Hot topics in cloud computing (HotCloud'10), p. 1-7, 2010.

Chiueh et al., "An Agentless Approach to Application-level Dependency Map Discovery Using Virtual Machine Inspection", Pending Patent, 2012.

Chen et al., "Automating Network Application Dependency Discovery: Experiences, Limitations, and New Solutions", Proceedings of the 8th USENIX conference on Operating systems design and implementation, pp. 117-130, 2008, Abstract; Chapter-1 to Chapter 7.

Taiwan Patent Office, Office Action, Patent Application Serial No. TW101150186, Nov. 24, 2014, Taiwan.

\* cited by examiner

METHOD AND SYSTEM FOR ANALYZING ROOT CAUSES OF RELATING PERFORMANCE ISSUES AMONG VIRTUAL MACHINES TO PHYSICAL MACHINES

TECHNICAL FIELD

The disclosure generally relates to a method and system for analyzing root causes of relating performance issues among virtual machines to physical machines.

BACKGROUND

Rapid advances in network communications and hardware/software techniques bring huge e-services to enrich daily life of human beings. As the growing and progressing of virtualization techniques, these services may be moved to run on virtual machines. Some techniques may offer new economic models providing such as computing power, data access, and network transformation as utilities. For example, one model is also known as Infrastructure as a Service (IAAS) in the area of could computation. As an IAAS provider owning a physical data center, monitoring the whole physical data center to know the conditions of the facilities, such as the cooling system and the power supply/UPS system, or the usage of the physical devices is absolutely needed and many existing monitoring system, e.g. zenoss and WhatsUp, may support these requirements.

One of current technologies discloses an LWT method integrated into a Xen hypervisor running on a small-scale data center to identify inter-VM dependencies. Another technology introduces the concept of server consolidation using virtualization. For meeting a service level agreement (SLA), the technology is based on an algorithm for migrating virtual machines within a group of physical machines when performance problems are detected. Yet another technology provides a system for application performance control and dynamic resource allocation in virtualization environments. This technology predicts the resource demand to meet application-level performance requirements. Yet another technology disclose an alarm correlation algorithm based on the TCP/IP mode, and the alarm correlation (or event correlation) is a key function in network management systems. This technology classifies the alarms according to an identifier of each TCP/IP Protocol type, e.g. port number in TCP, and then clusters the alarms to find the root cause alarm.

There exists some works on root cause analysis of application performance problems. One of these technologies mentioned that monitoring transactions with multiple components may gather component level information. And, for transactions exceeding a threshold, the data collected from the individual components can be analyzed to find the potential root cause of the performance issue. Another technology disclosed a monitoring system including agent components that monitor and report performance parameters, e.g. response time, and a web-based server may be used to display the collected data. Also, a root cause analysis system applied statistical algorithms to detect performance degradations in specific parameters and some pre-defined parameter dependency rules are used to correlate the performance degradations to the root causes of the problems. Yet in another technology, the performance metrics gathered from agents for transactions are used to compare with baseline metrics to automatically detect anomalies, and a monitoring system reports the components of the transactions that out-of acceptable ranges as the root causes.

One technology disclose a central server named Application-level Dependency Discovery and Maintenance and a system module integrated within hypervisor(s) are used to collect the application trajectory in thread granularity and the application-level dependency map for a specific application. An example of the application trajectory with a root node of browser, a start time, and an end time is shown in FIG. 1. Wherein the application trajectory 100 in the FIG. 1 starts from browser 1, and if an application A has data exchange with another application B and the application A is a client side of the A to B connection, then application A depends on application B. For example, if load balancer (application A) has data exchange with application server 2 (application B), then load balancer depends on application server 2. In other words, an application trajectory may be equivalent to a static view of trajectory. Information of virtual machines or physical machines may be added onto an application trajectory to help understanding of application deployment.

The above works or technologies either only concern about the usage and workload of physical machines and ignore hardware issues for virtual machine resource allocation or concern only the hardware issues or performance issues on physical machines but not be integrated with the concept of virtualization. However, the existing monitoring system or the network monitoring system (NMS) may not diagnose the performance issues among virtual machines running on the physical data center, and the root causes of these performance issues may come from the hardware issues of the physical data center, such as buggy disks or overloading switches and so on. Therefore, it is important to solve the problems of relating performance issues among virtual machines to physical machines.

SUMMARY

The exemplary embodiments of the present disclosure may provide a method and system for analyzing root causes of relating performance issues among virtual machines to physical machines.

One exemplary embodiment relates to a method adapted to a physical data center, for analyzing root causes of relating performance issues among virtual machines (VMs) to physical machines (PMs). The method comprises: applying an application-level dependency discovery and anomaly detection to find application-level dependencies in one or more VMs running on a plurality of PMs in the physical data center, and generate an application-level topology with anomaly; transferring the application-level topology with anomaly to a VM-level dependency; transferring the VM-level dependency to a PM-level dependency via a physical and virtual resource mapping, and generating a group of event sets; and generating a prioritized event list by prioritizing the group of event sets.

Another exemplary embodiment relates to a system for analyzing root causes of relating performance issues among virtual machines (VMs) to physical machines (PMs). The system may be adapted to a physical data center, and may comprise an application-level anomaly detection module, an abstraction module, and an event generation and prioritization module. The application-level anomaly detection module is configured to find an application-level dependency in one or more VMs running on a plurality of PMs in the physical data center, and generate an application-level topology with anomaly. The abstraction module is configured to abstract the application-level topology with anomaly to a VM-level dependency, and then transfer the VM-level dependency to a PM-level dependency. The event generation and prioritization module is configured to get a PM communication topology, generate a group of event sets by using the PM communication topology, and produce a prioritized event list by prioritizing the group of event sets.

DETAILED DESCRIPTION OF THE EXEMPLARY EMBODIMENTS

Figure 1:
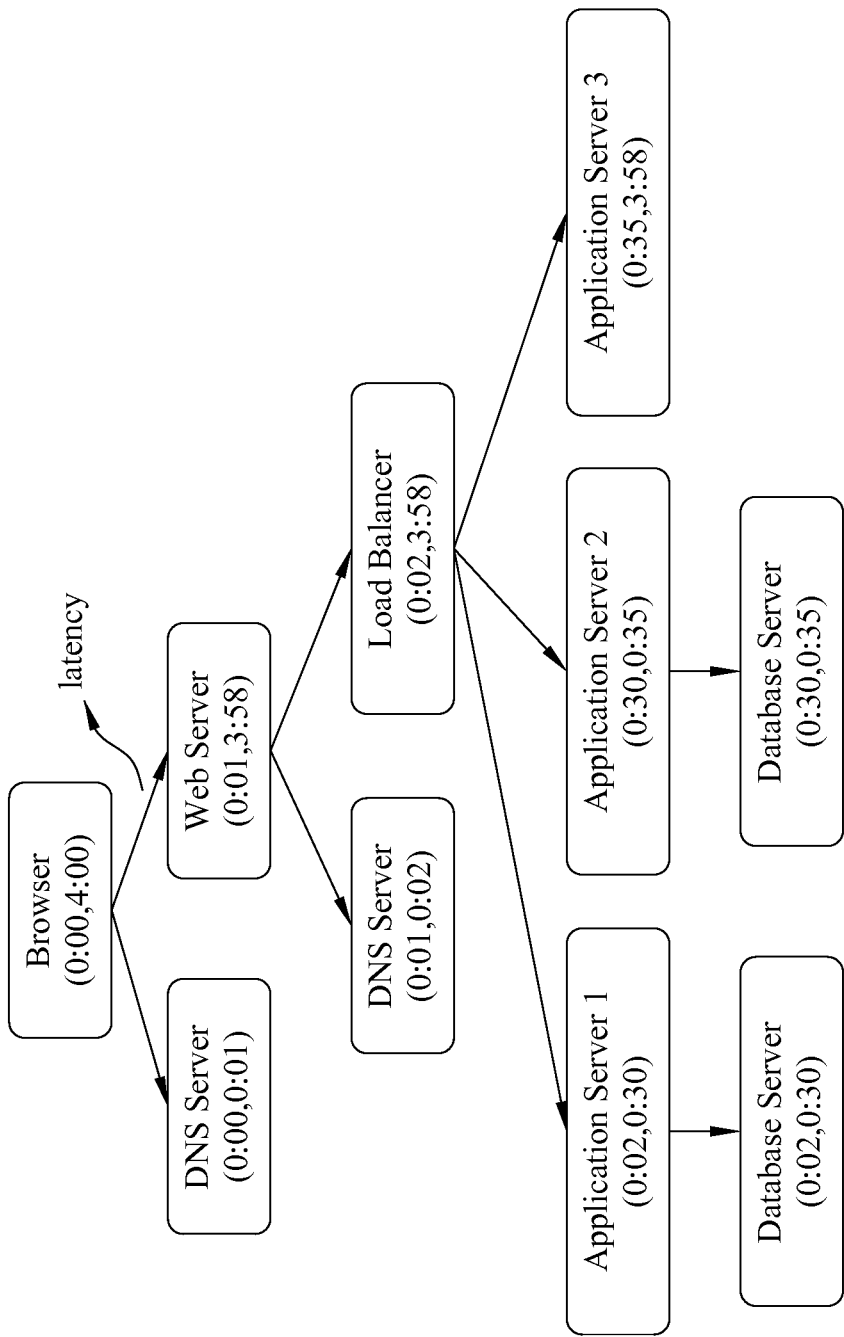
FIG. 1 shows an example of an application trajectory.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The exemplary embodiments disclose a technique for analyzing root causes of relating performance issues among virtual machines to physical machines. In the disclosure, an Infrastructure as a Service (IAAS) is used, wherein one or more virtual machines may run on at least one data center equipping with physical devices as physical machines, network storages and switches, and the data center may refer to a physical data center. Consider an exemplary scenario as follows. A virtual data center operator, who is a customer renting resources from the physical data center operator to create his/her own virtual data center, discovers application performance issues in his/her virtual data center. An application performance issue may be, but not limited to, gotten a very long response time from a web site. In the scenario, the exemplary embodiments may monitor the physical devices in the physical data center, in which a huge of virtual machines running on, and figure out the root causes of the performance issues among virtual machines in an identical virtual data center by relating the performance issues to the hardware issues.

According to the exemplary embodiments, relating the performance issues among virtual machines running on one or more physical machines to the hardware issues of the physical machines may involve the components such as application-level dependency discovery and anomaly detection, physical and virtual resource mapping, hardware monitoring for event generation and consolidation, event prioritization flowchart for root cause analysis and so on. In other words, the exemplary embodiments transfer the performance issues on the virtual machines to the hardware issues of the physical machines for helping to figure out and solve the root causes, and the root cause analysis technique may be accomplished by using application-level dependencies, physical/virtual resource mapping, and network routing information.

Figure 2:
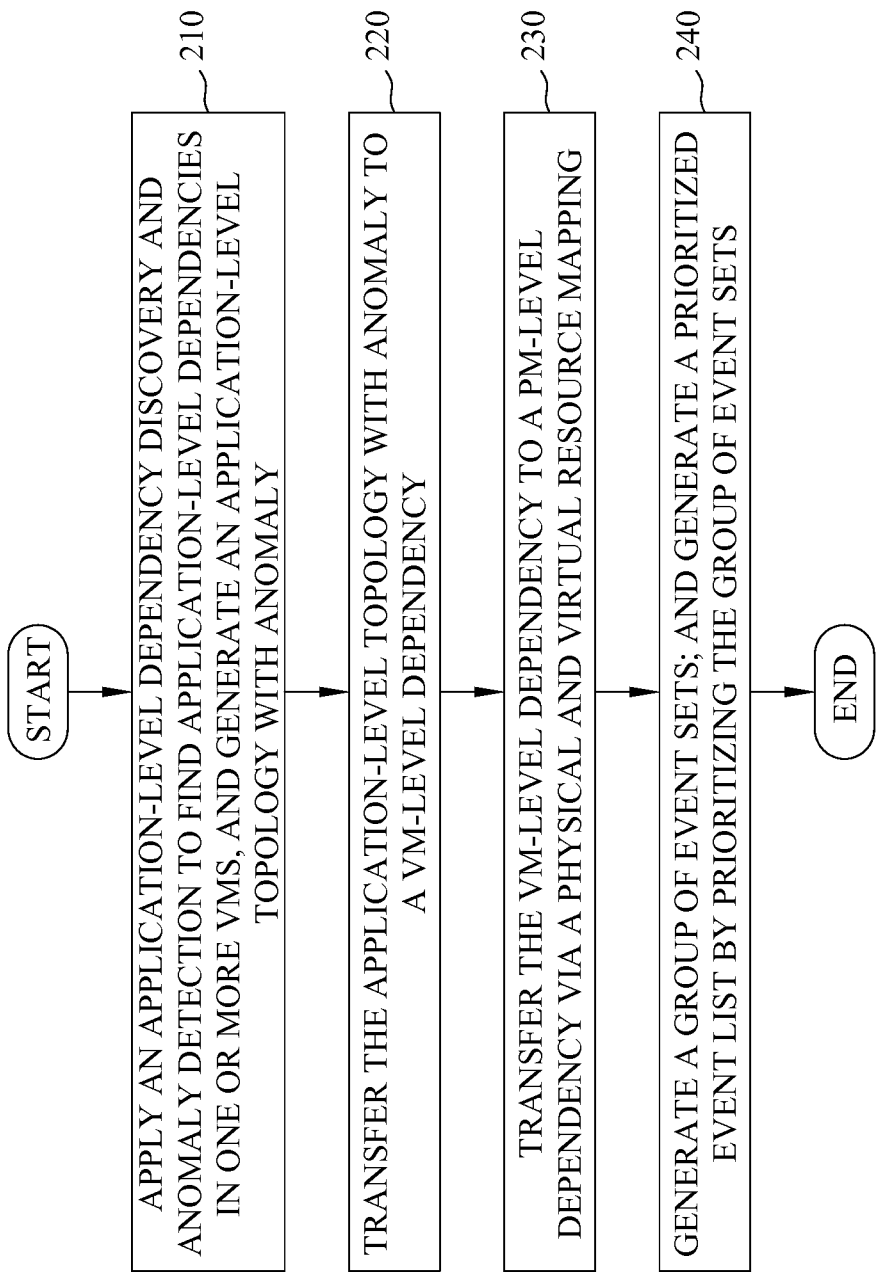
FIG. 2 shows an operation flow of a method for analyzing root causes of relating performance issues among virtual machines to physical machines, according to an exemplary embodiment.

FIG. 2 shows an operation flow of a method for analyzing root causes of relating performance issues among virtual machines to physical machines, according to an exemplary embodiment. Referring to FIG. 2, the method may applying an application-level dependency discovery and anomaly detection to find application-level dependencies in one or more virtual machines (VMs) (step 210), and generate an application-level topology with anomaly, then transfer the application-level topology with anomaly to a VM-level dependency (step 220). The method then performs a physical and virtual resource mapping to transfer the VM-level dependency to a physical machine level dependency and eventually generates a group of event sets (step 230). The method may further generate a prioritized event list by prioritizing the group of event sets (step 240). The operation flow of the method shown in FIG. 2 may recommend an administrator of a physical data center the root causes of the performances issues among customers' virtual machines. The followings further describe the detailed for each of the steps involved.

In step 210, a central server named ADDM (Application-level Dependency Discovery and Maintenance) and a system module integrated within a hypervisor may be used to collect the application trajectory in thread granularity and the application-level dependency map for a specific application. An example of the application trajectory with a root node of browser, start time equal to 0:00, and end time equal to 4:00 may be shown in FIG. 1. Information of virtual machine or physical machine may be added onto an application trajectory to help understanding of application deployment. For example in the disclosed embodiments, applying a backward trace, the delay time or latency related to each hop may be obtained. Under a normal environment, it may collect the start and end time interval for a whole application many times to find an average latency related to each hop, which refers to a training phase. In other words, an average latency related to each hop on the application trajectory may be found at a training phase. By adding a corresponding delta time period as a tolerance to the average latency related to each hop (or just using the average latency related to each hop), a baseline latency of each hop may be generated. When the ADDM server is requested to collect the current response time for the whole specific application, the ADDM server may also check to determine whether the average latency related to the each hop exceeds its corresponding baseline latency. These hops with their latency exceeding their corresponding baseline latency are detected as an anomaly.

In step 220, physical resource usage of virtual machines may involve computing power, data access, and network transmission. In terms of computing power, the disclosed embodiments may use a repository to keep the information about which physical machine a specific virtual machine is running on. While creating a virtual machine or after a virtual machine being migrated, which physical machine the virtual machine is running on may be known no matter what kinds of virtual machine creation/migration algorithms (such as resource allocation algorithms) are used. In terms of data access, the disclosed embodiments may use a repository to keep the information about which virtual machine a virtual volume is attached to, and a repository to keep the information about which network storage devices a virtual volume is related to. In other words, the information about which virtual volumes are used by a specific virtual machine and these volumes are located at which network storages may also be kept in the repository while creating the virtual volumes and then attaching them to the specific virtual machine. Again, keeping this information in the repository may be combined with any of the virtualization algorithms.

On the other hand, in terms of network transmission, the disclosed embodiments may use at least one repository to keep the information about how data of a virtual machine are transferred to the Internet or how data are transferred between two virtual machines in the identical virtual data center. To know the answer, the disclosed embodiments keep the information of a routing path between each pair of a plurality of physical machines, and the information of at least one routing path between each of the plurality of physical machines and each of one or more physical devices. The information may be kept in at least one repository. A physical device may be, but not limited to a gateway or a network device such as a switch, a physical storage and so on. The routing path between a pair of physical machines means a physical machine sending packages/frames to the other physical device follows the path. As which physical machines the virtual machines run on are known, therefore, how data are transferred between two virtual machines can be known.

Figure 3:
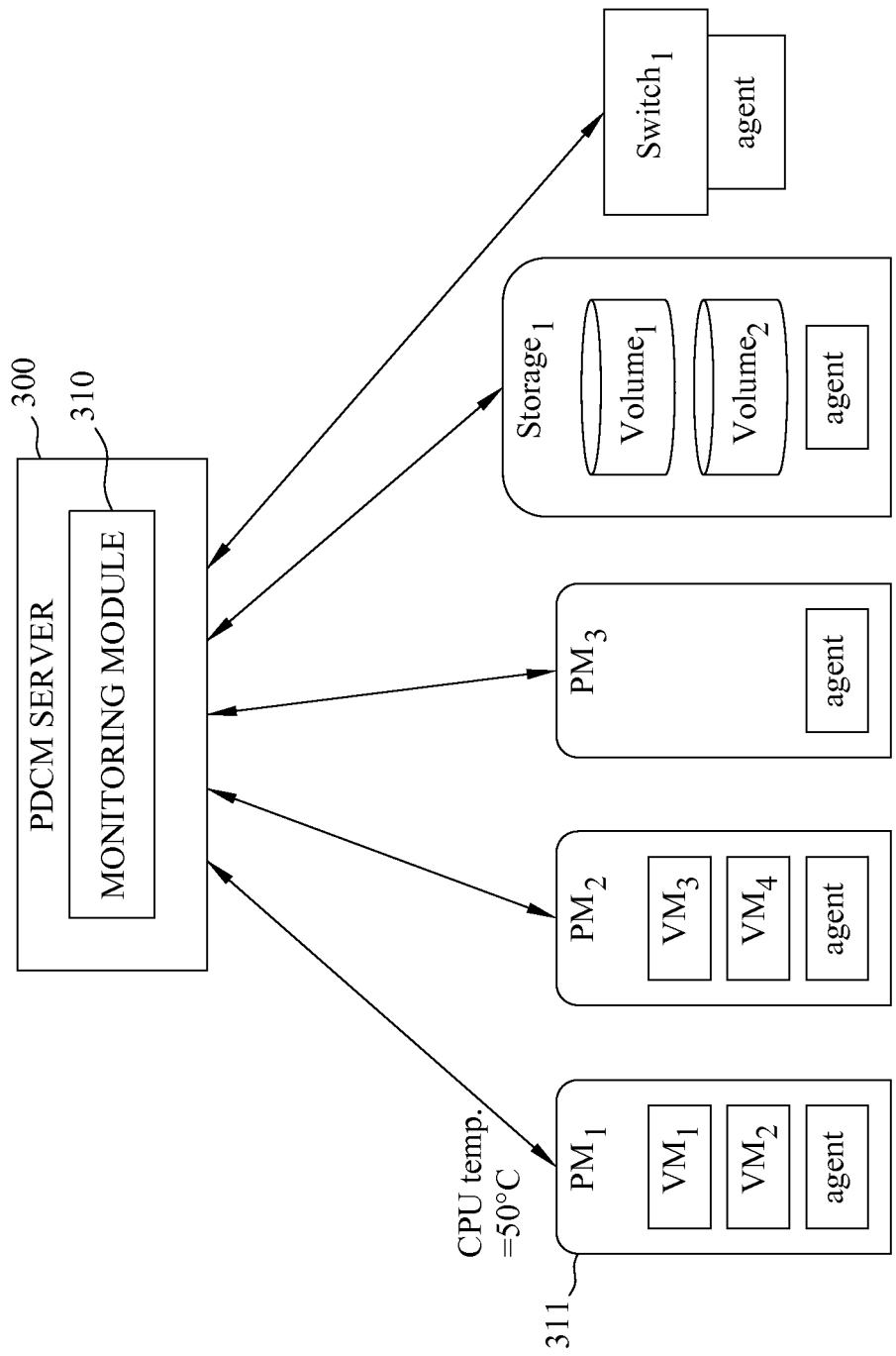
FIG. 3 shows a schematic view of agents installed at physical devices for receiving/responding PDCM requests, according to an exemplary embodiment.

As shown in FIG. 3, an agent may be installed in each monitored physical device for receiving/responding physical data center management (PDCM) requests, according to an exemplary embodiment. The agent may collect the physical device information and keeps the information in a corresponding repository. The physical device information may be, but not limited to, manufactory, CPU/memory utilization, free partition space, bit/error rates of interfaces, and other information. The agent may get the physical information by IPMI, SMART, or even parsing syslog and results of system commands such as "top" or "xentop." When the agent receives a request from a monitoring module 310 of a server such as a PDCM server 300, it may send corresponding values back to the PDCM server 300 to get the physical device information at the PDCM server. An administrator of a physical data center (PDC) may set a probing period, e.g. 350 seconds, to send requests to each physical device in the PDC and gets a last value corresponding to the each physical device (for example a CPU temperature 50° C. at a physical machine $PM_1$) every probing period (e.g. 350 seconds).

In step 230, it may also set distinct thresholds for distinct last values corresponding to the distinct physical devices. When the obtained values exceed their corresponding given thresholds, the server such as a PDCM server may generate corresponding events for corresponding physical devices to notify the physical data center. Besides, the PING requests may be used to check whether a physical device is reachable. The monitoring module had been commercialized such as Zenoss or WhatsUp. Some of the generated events may have correlations, wherein a group of events may have an identical root cause. The disclosed exemplary embodiments may apply the existing algorithms to consolidate the group of events after the correlated events are generated.

In step 240, the group of event sets may be prioritized according to an event prioritization algorithm and will be described later below. In the prioritized event list, the events with a former order may have a higher possibility of being the root causes of the performance issues and they should be solved faster than the events with a later order. Combining the above components involved in the steps 210~240, the followings illustrate an overall operation flow for an exemplary application to analyze the root causes of the performance issues among virtual machines in an identical virtual data center by relating the performance issues to the hardware issues.

Figure 4:
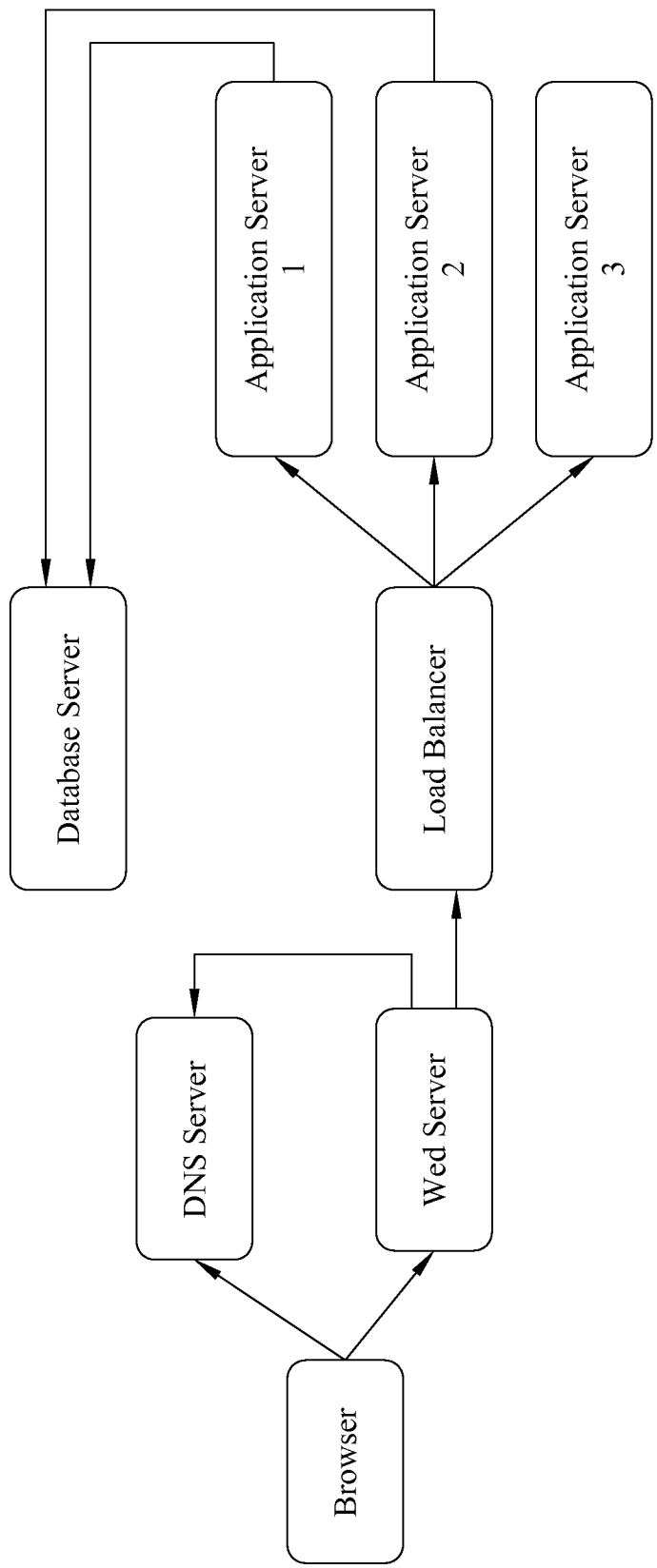
FIG. 4 shows a schematic view of an exemplary application dependency topology in a virtual data center, according to an exemplary embodiment.
Figure 5:
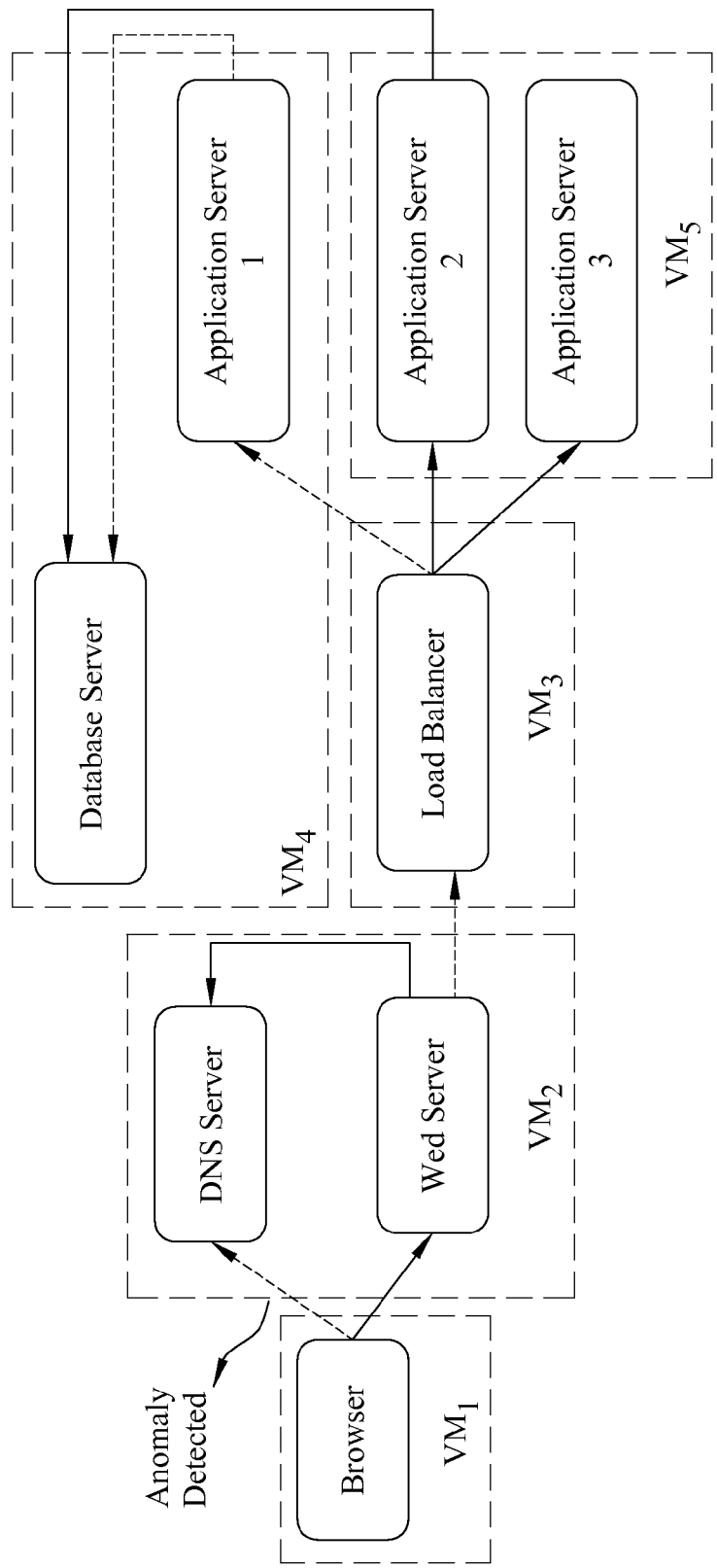
FIG. 5 shows a schematic view illustrating virtual machines the applications are running on and anomalies detected in the application-level dependency map of FIG. 4, according to an exemplary embodiment.

According to step 210, an ADDM server may be used for being requested to get the current latency of applications in a virtual data center and detect anomaly. The application dependency topology of the exemplary applications in the virtual data center is as shown in FIG. 4. From the application dependency topology of FIG. 4, the ADDM server also figures out the virtual machines which the applications are running on and checks to determine whether the obtained current latency for each hop among the applications exceeds its corresponding baseline. FIG. 5 shows a schematic view illustrating the virtual machines the applications are running on and anomalies detected in the application-level dependency map, according to an exemplary embodiment. For example, an anomaly denoted by a dotted arrow is detected for the hop from browser in virtual machine $VM_1$ to DNS server in virtual machine $VM_2$, and there are four anomalies detected in the application-level dependency map. The information on the corresponding virtual machines denoted by $VM_1$, $VM_2$, $VM_3$, and $VM_4$, for the four anomalies may be sent to a PDCM server.

Figure 6:
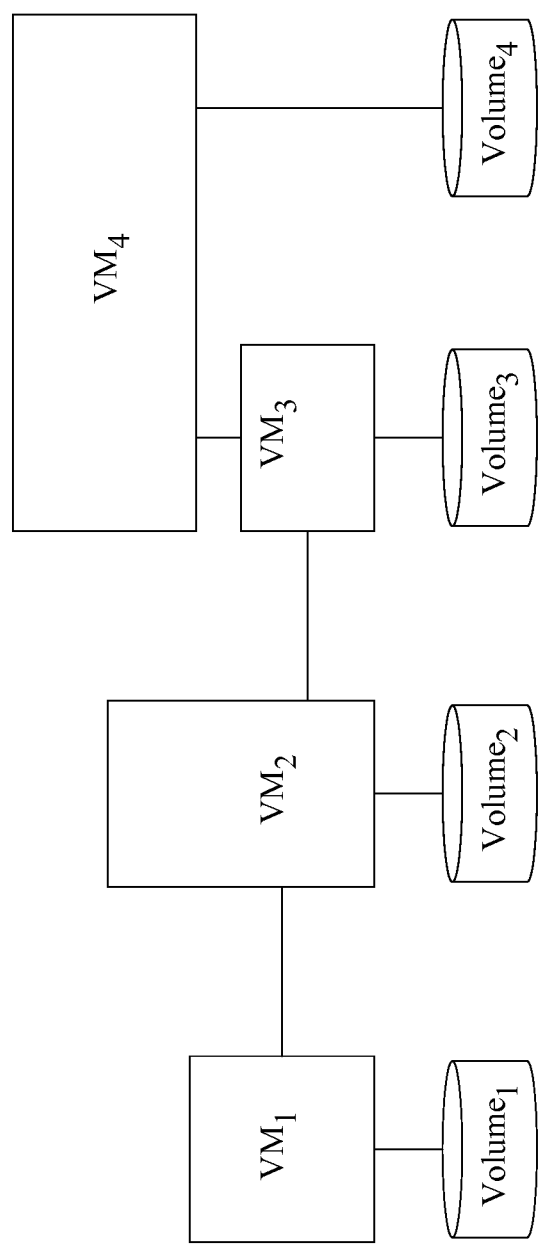
FIG. 6 shows a schematic view illustrating the communications among the virtual machines and the virtual volumes for FIG. 5, according to an exemplary embodiment.

According to step 220, used virtual volumes for VMs may be obtained from the repository and the application level to VM level is abstracted. Therefore, the attached virtual volumes of each virtual machine of $VM_1$, $VM_2$, $VM_3$ and $VM_4$, are found, as shown in FIG. 6, and the view point of application level is abstracted to the view point of virtual machine level in the PDCM server. In addition, any two virtual machines, say $VM_A$ and $VM_B$, have communications to each other means that the applications running on them have communications to each other. For example, $VM_2$ and $VM_3$ in FIG. 6 have communications to each other. The reason is Web Server on $VM_2$ has communications to Load Balancer on $VM_3$. Also, these two virtual machines are recognized as having communications to each other, thereby there existing a link between $VM_2$ and $VM_3$, as shown in FIG. 6. A link between a virtual machine and a volume indicates the volume is attached to the virtual machine. For example, the $volume_2$ is attached to virtual machine $VM_2$.

Figure 7:
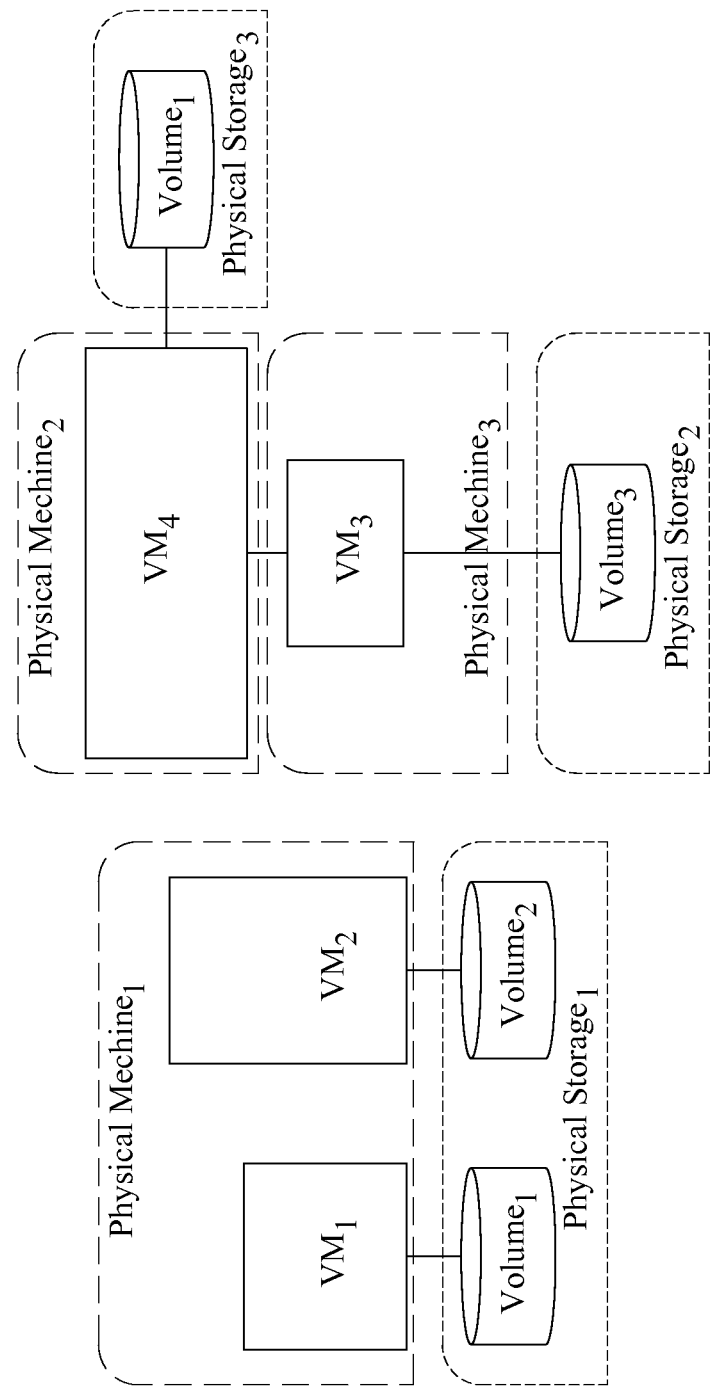
FIG. 7 shows a schematic view illustrating the abstraction from the virtual machine level of FIG. 6 to the physical machine level, according to an exemplary embodiment.

According to step 230, information on the physical machines and physical devices such as storage devices may be obtained from the repository, and the virtual machine level is abstracted to a physical machine level. Therefore, the view point of virtual machine level in FIG. 6 is further abstracted to the view point of physical machine level. In other words, which physical machines or physical storages the virtual machines or the virtual volumes are running on or kept at can be found from at least one repository. FIG. 7 shows a schematic view illustrating the abstraction from the virtual machine level of FIG. 6 to the physical machine level, according to an exemplary embodiment. Any two physical machines, say $PM_A$ and $PM_B$, have communications to each other means that the virtual machines running on them have communications to each other. For example, $PM_1$ and $PM_3$ in FIG. 7 have communications to each other because $VM_2$ in $PM_1$ and $VM_3$ in $PM_3$ have communications to each other. A physical machine and a physical storage have communications to each other means that the virtual machines running on the physical machine and the volume attached to the physical storage have communications to each other. For example, $VM_3$ in $PM_3$ and $volume_3$ in physical $storage_3$ have communications to each other.

Figure 8:
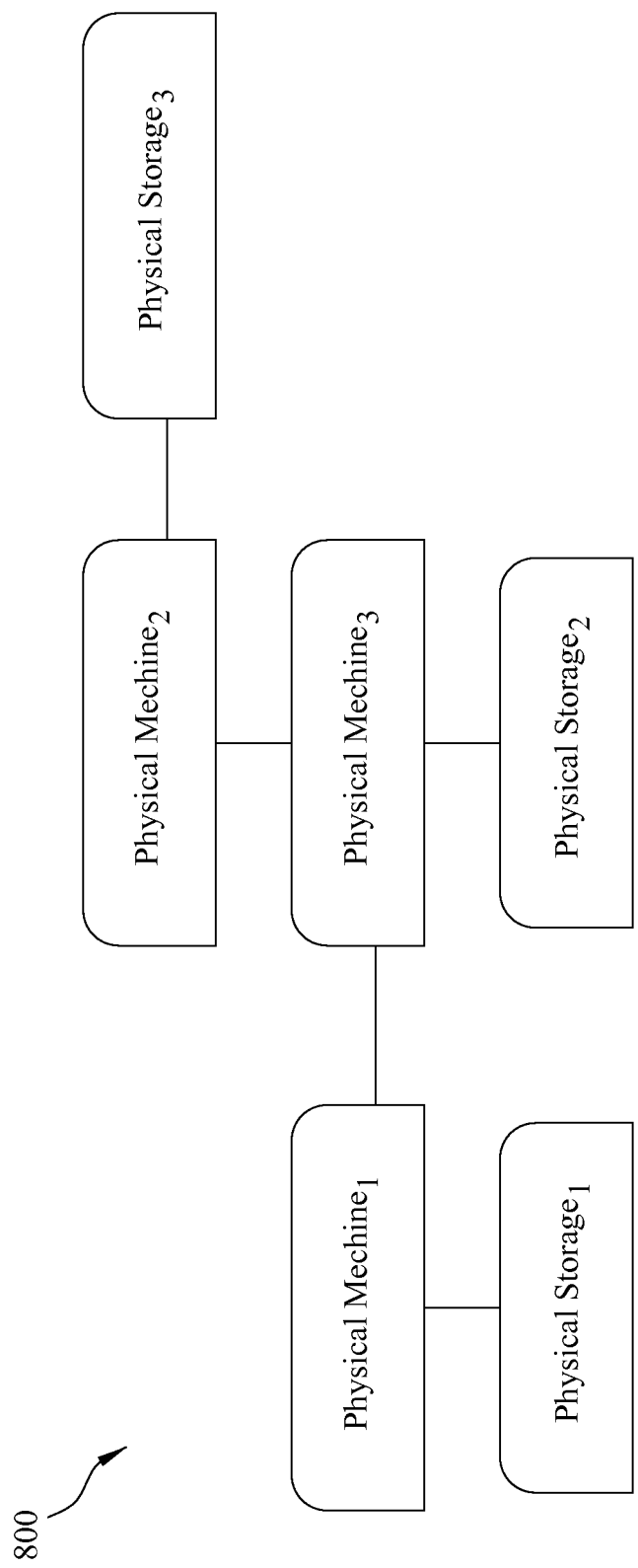
FIG. 8 shows a schematic view illustrating the communications among the physical machines and the physical network storages in the physical data center, according to an exemplary embodiment.

After the abstraction procedure of FIG. 7, the original application-level dependency in a virtual data center as in FIG. 5 is transformed into the physical machine level dependency in a physical data center. FIG. 8 shows a schematic view illustrating the communications among the physical machines and the physical network storages in the physical data center, according to an exemplary embodiment. Wherein, in the PM communication topology 800, a link between two physical machines means that the two physical machines have communications to each other, and a link between one physical machine and one physical storage means that the physical machine and the physical storage have communications to each other.

Figure 9:
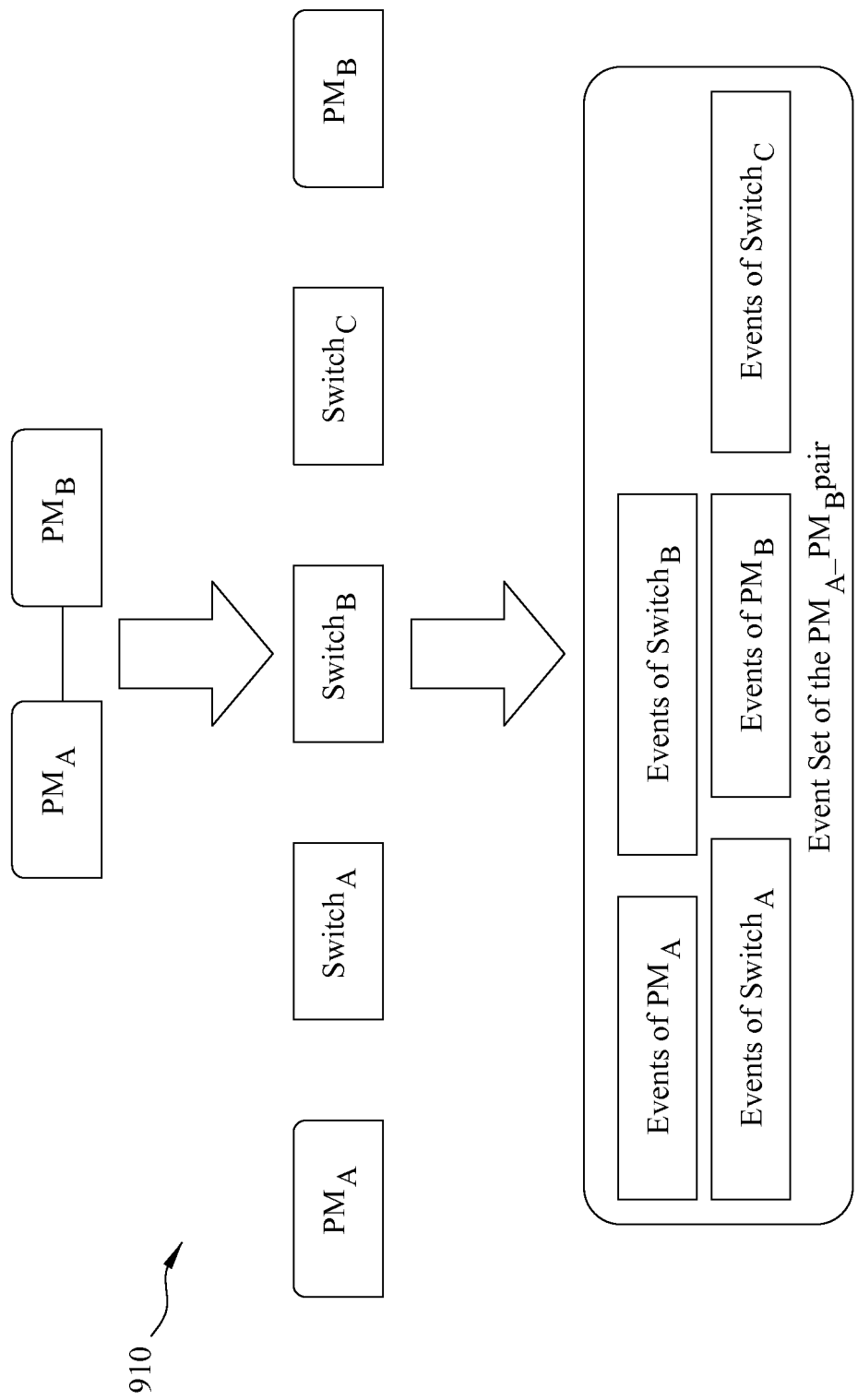
FIG. 9 shows an exemplary routing path between two exemplary physical machines having communications to each other, and the gotten corresponding events, according to an exemplary embodiment.

As mentioned earlier, the disclosed embodiments may use at least one repository to keep the information keep the information of a routing path between each pair of a plurality of physical machines, and the information of at least one routing path between each of the plurality of physical machines and each of one or more physical devices. According, for any two physical machines recognized as having communications to each other, the disclosed exemplary embodiments may get the routing path (i.e. data transmission path) between the two physical machines from the repository, and get the corresponding events. For example, FIG. 9 shows an exemplary routing path 910 between two exemplary physical machines (say $PM_A$ and $PM_B$) having communications to each other, and the gotten corresponding events 920, according to an exemplary embodiment. As shown in FIG. 9, the routing path 910 from $PM_A$ to $PM_B$ goes through $Switch_A$, $Switch_B$, and then $Switch_C$. After collecting all of the current events (which have been consolidated) related to the physical devices involved in the data transmission path, an event set of the $PM_A$_$PM_B$ pair is formed. The event set of the $PM_A$_$PM_B$ pair includes events of $PM_A$, events of $Switch_A$, events of $Switch_B$, events of $Switch_C$, and events of $PM_B$.

Figure 10:
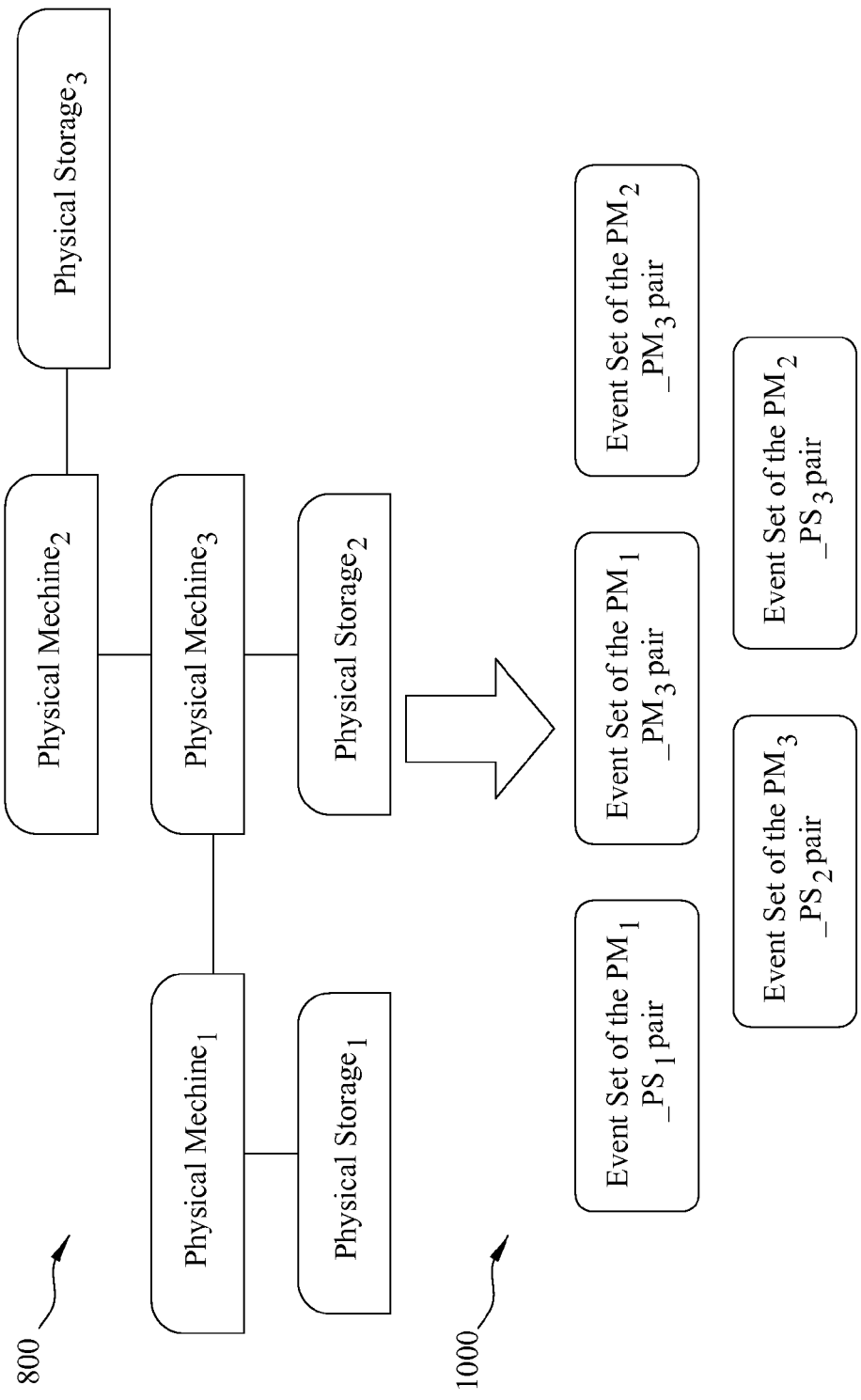
FIG. 10 shows an exemplary group of event sets for the physical machine communication topology of FIG. 8, according to an exemplary embodiment.

Accordingly, for any two physical machines recognized as having communications to each other, the disclosed exemplary may get a corresponding event set. Therefore, a group of event sets may be formed by using the physical machine communication topology. FIG. 10 shows an exemplary group of event sets 1000 for the physical machine communication topology 800 of FIG. 8, according to an exemplary embodiment. In FIG. 10, the group of event sets 1000 may include an event set of the $PM_1$_ pair, an event set of the $PM_1$_$PM_3$ pair, an event set of the $PM_2$_$PM_3$ pair, an event set of the $PM_3$_$PS_2$ pair, and an event set of the $PM_2$_$PS_3$ pair, wherein PM represents physical machine and PS represents physical storage. As may be seen, number of event sets in the group of event sets equals to number of links in the physical machine communication topology. In other words, the PM-level dependency is a PM communication topology, and the group of event sets may be generated by using the PM communication topology.

According to step 240, a group of event sets may further be prioritized according to an event prioritization algorithm. According to one exemplary embodiment of the event prioritization algorithm, for an event in the group of event sets, when it is contained in two event sets, a support count is defined for this event. The support count for an event may be defined by the number of event sets that the event appears in. Therefore, the support count of each event in the group of event sets may be calculated and then, all the corresponding events are sorted into a decreasing order of the support count. When there are two events with the identical support counts, it may sort them according to the event severity. An exemplary prioritized event list 1100 is shown as in FIG. 11, which may be further sent to the physical data center. In other words, steps 210-240 performed by the application-level anomaly detection module, the abstraction module, and the event generation and prioritization module may use an ADDM server (a first server) and a system module integrated within a hypervisor, and a PDCM server (a second server), and cooperate with at least one repository.

Figure 11:
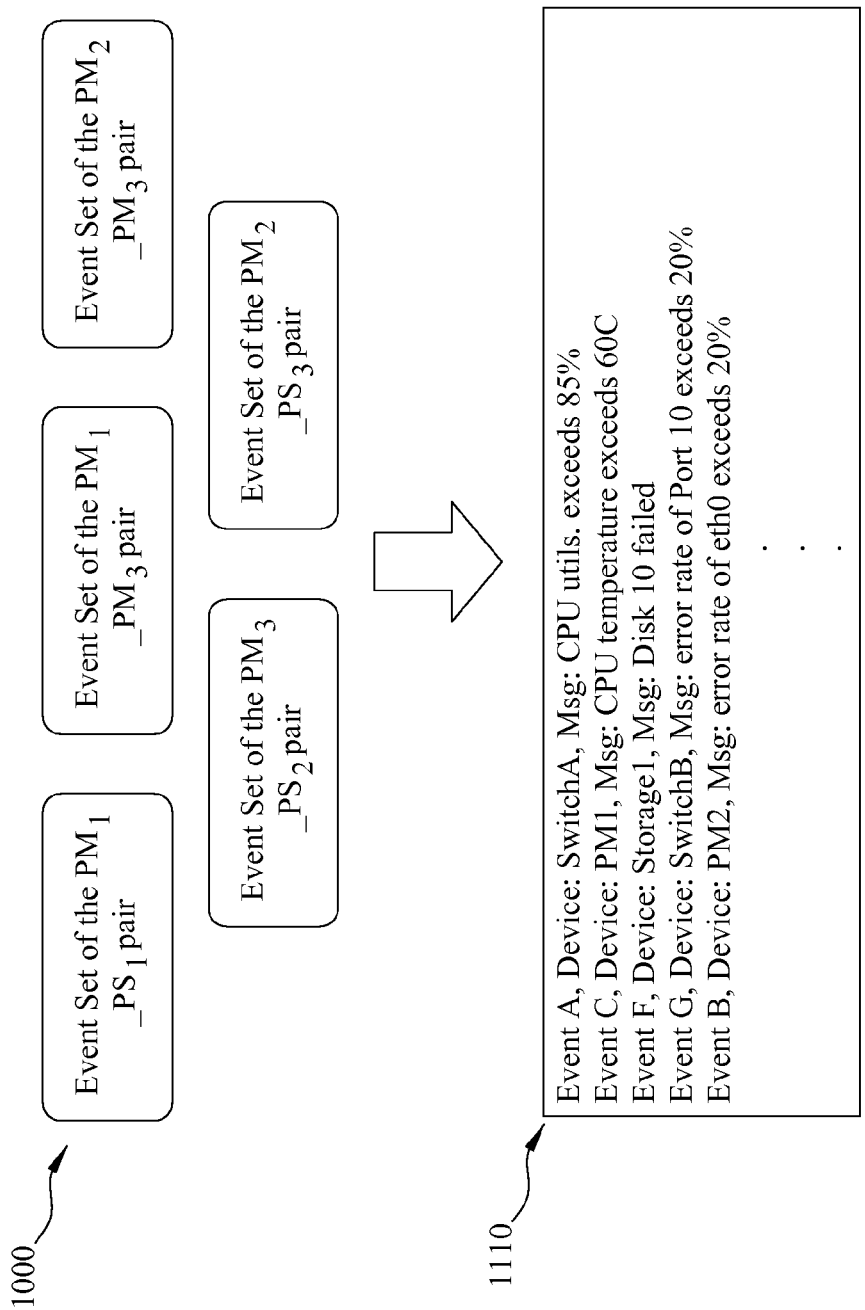
FIG. 11 shows an exemplary prioritized event list from the group of event sets of FIG. 10, according to an exemplary embodiment.

As shown in FIG. 11, each event in the prioritized event list 1100 may associate a device such as a physical machine or a physical device, and has an associated message corresponding to a hardware issue to the device. As mentioned earlier, an event with a former order in the list may have a higher probability of being the root causes of a specific performance issue. And it is better to solve the specific performance issue of the event earlier than that of the event with a later order. For example, an event A associated a device named $switch_A$ has a message of CPU utilization exceeding 85%, and the performance issue of CPU utilization exceeding 85% has a highest probability of being the root causes.

The above principle for prioritizing the group of event sets 1000 is that a common hardware issues, for example, the overloading of a switch, may be the bottleneck of the corresponding performance issues among virtual machines in an identical virtual data center and solving them with the higher priorities may speed up enhancing the performance. Counting the exceeding times of events in the group of event set is the basic idea of prioritization. The algorithm for prioritizing a group of event sets may be varied. For example, it may take into account the event severity and the device type to a specific weight (rather than 1) for each kind of events and prioritize the events by using weighted support counts.

Figure 12:
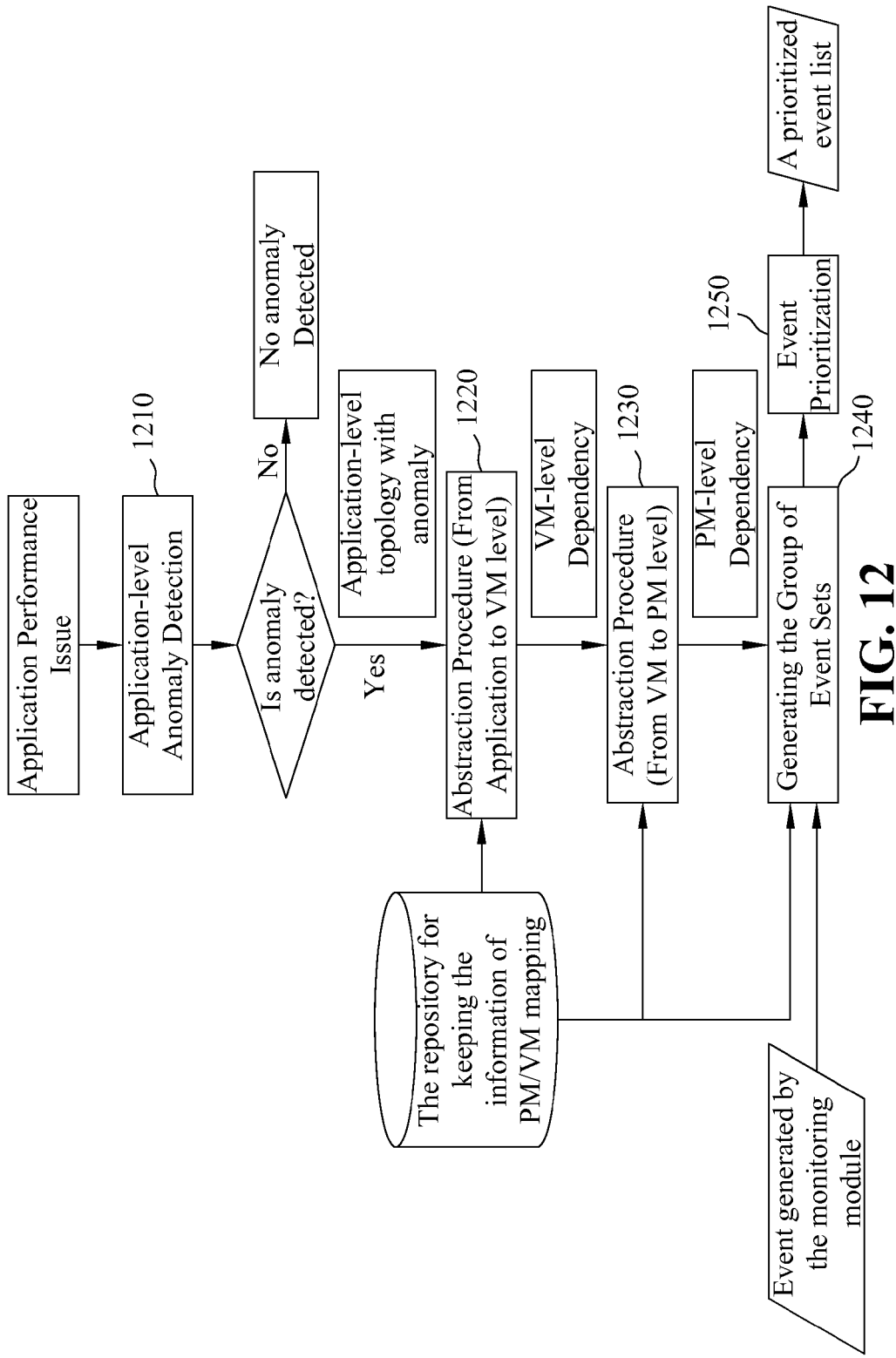
FIG. 12 shows an operation flow of event prioritization for root cause analysis, according to an exemplary embodiment.

Therefore, according to the exemplary embodiments, an operation flow of event prioritization for root cause analysis may be summarized as in FIG. 12, which may include an application-level anomaly detection (step 1210) to get an application-level topology with anomaly, a first abstraction procedure (step 1220) (from application level to virtual machine level (VM-level) to get a VM-level dependency, a second abstraction procedure (step 1230) (from VM-level to PM-level) to get a PM-level dependency, generating a group of event sets (step 1240) from the PM-level dependency, and an event prioritization (step 1250) to produce a prioritized event list. Wherein, at least one repository may be used for keeping the information of PM/VM mapping during the two abstraction procedures and generating the group of event sets. A monitoring module may be used for generating each event of the group of event sets.

The disclosed exemplary embodiments of for root cause analysis may be adapted to a physical data center (PDC) having physical machines, one or more network storages, and one or more network devices. A physical data center management module may be used to continuously monitor the physical machines, the network storages, and the network devices, and generate events for the hardware components to analyze the performance issues corresponding to the hardware components. At least one repository may be used to keep the information that a virtual machine is running on which physical machine, a virtual volume is attached to which virtual machine, a virtual volume is related to which network storage(s), and the routing paths between any of two physical devices.

Figure 13:
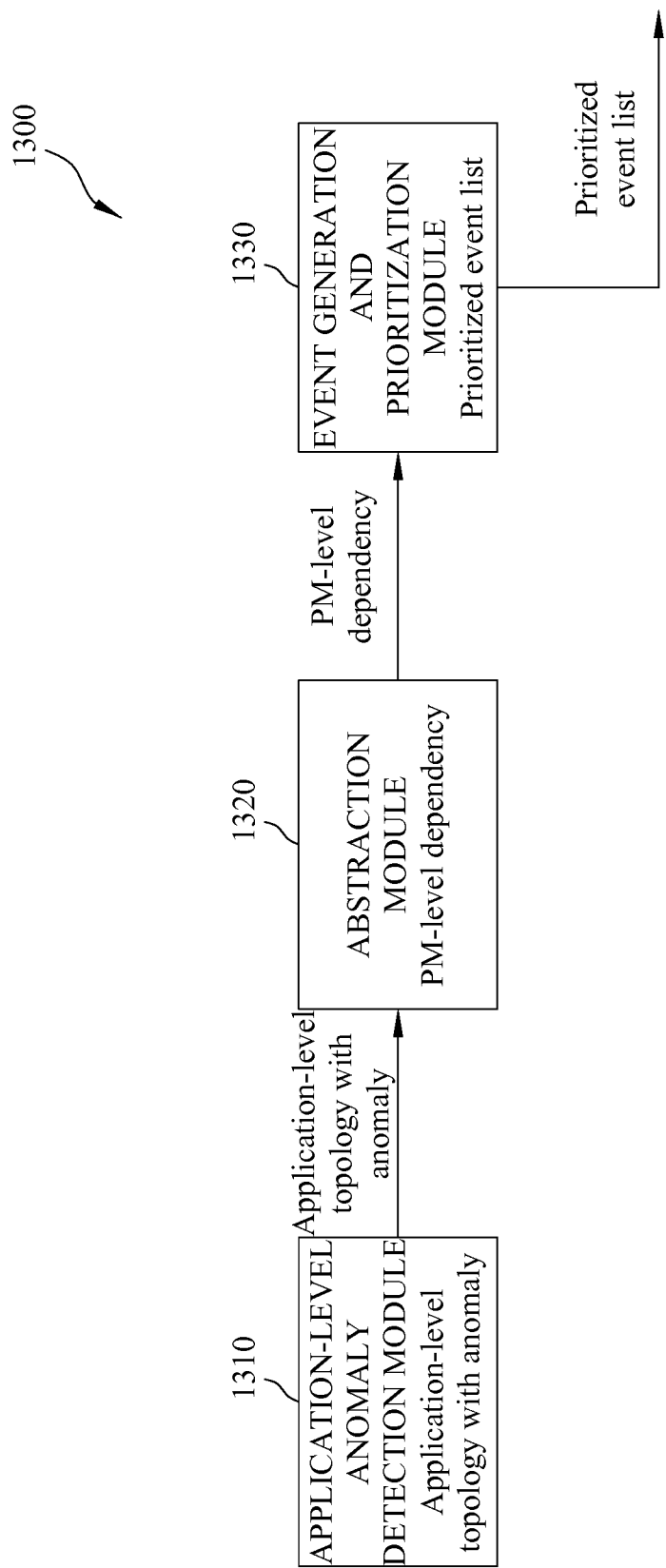
FIG. 13 shows a system for analyzing root causes of relating performance issues among virtual machines to physical machines, according to an exemplary embodiment.

Accordingly, one exemplary embodiment of a system for analyzing root causes of relating performance issues among virtual machines to physical machines may be shown as in FIG. 13. Referring to FIG. 13, the system 1300 may be adapted to a physical data center, and may comprise an application-level anomaly detection module 1310, an abstraction module 1320, and an event generation and prioritization module 1330. The application-level anomaly detection module 1310 is configured to find an application-level dependency in one or more virtual machines (VMs) running on a plurality of physical machines (PMs) in the physical data center, and generate an application-level topology with anomaly. The abstraction module 1320 is configured to abstract the application-level topology with anomaly to a VM-level dependency, and then transfer the VM-level dependency to a PM-level dependency. The event generation and prioritization module 1330 is configured to get a PM communication topology, generate a group of event sets by using the PM communication topology, and produce a prioritized event list by prioritizing the group of event sets.

The system 1300 may be integrated in a physical data center management system module to continuously monitor the plurality of PMs, and one or more physical devices in the physical data center. A physical device may be, but not limited to a gateway or a network device such as a switch, a physical storage and so on. The system 1300 may further include at least one repository to keep the information of a routing path between each pair of the plurality of physical machines, and the information of at least one routing path between each of the plurality of physical machines and each of the one or more physical devices. The abstraction module 1320 may get information of used virtual volumes for VMs from the repository for abstracting the application level to the VM-level, and may get information of the plurality of PMs and one or more physical storages from the repository, for abstracting the VM level dependency to the PM level dependency. The event generation and prioritization module may get information of a routing path between each pair of PMs of the plurality of PMs from the repository, for generating a plurality of events corresponding to a plurality of physical devices over the routing path. Exemplary algorithm for prioritizing the group of event sets has been described earlier, and omitted here.

In summary, the exemplary embodiments provide a technique for analyzing root causes, which is accomplished by using application-level dependencies, physical/virtual resource mapping, and network routing information. The technique applies an application-level anomaly detection to get an application-level topology with anomaly, performs an abstraction procedure (from application level to a VM-level) to get a VM-level dependency, and an abstraction procedure (from the VM-level to a PM-level) to get a PM communication topology, and then generates a group of event sets from the PM communication topology. And, a prioritized event list is formed by performing a prioritization algorithm.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for analyzing root causes of relating performance issues among virtual machines (VMs) to physical machines (PMs), in a physical data center configured to perform the method comprising:
   providing communications between at least two VMs such that applications running on the at least two VMs communicate with each other;
   applying an application-level dependency discovery and anomaly detection to find an application-level dependency in one or more VMs running on a plurality of PMs in the physical data center, and generate an application-level topology with anomaly;
   transferring the application-level topology with anomaly to a VM-level dependency;
   transferring the VM-level dependency to a PM-level dependency via a physical and virtual resource mapping, and generating a group of event sets; and
   generating a prioritized event list by prioritizing the group of event sets,
   wherein a number of event sets in the group of event sets is equal to a number of links in the PM-level dependency.

2. The method as claimed in claim 1, wherein the application-level dependency discovery and anomaly detection further includes:
   finding an average latency related to each of a plurality of hops on an application trajectory at a training phase; and
   adding a corresponding delta time period as a tolerance to the average latency related to the each hop, and generating a corresponding baseline latency of the each hop.

3. The method as claimed in claim 2, wherein whether the average latency related to the each hop of the plurality of hops exceeds its corresponding baseline latency is further determined, and these hops with their latency exceeding their corresponding baseline latency are detected as an anomaly.

4. The method as claimed in claim 1, wherein a repository is used to keep at least one information on a physical resource usage of one or more virtual machines.

5. The method as claimed in claim 1, wherein said method further uses at least one repository to keep a first information of a routing path between each pair of a plurality of physical machines, and a second information of at least one routing path between each of the plurality of physical machines and each of at least one physical device.

6. The method as claimed in claim 1, wherein each event in the prioritized event list associates a device and has an associated message corresponding to a hardware issue to the device.

7. The method as claimed in claim 6, wherein the device associated by the each event is one of a physical machine and a physical device, and said physical device is one of physical machines, network storages, and network devices.

8. The method as claimed in claim 1, wherein said physical and virtual resource mapping further includes:
   obtaining an information on at least one physical machine and at least one physical device from at least one repository and abstracting the VM-level dependency to the PM-level dependency.

9. The method as claimed in claim 1, wherein generating the group of event sets further includes:
   for each pair of PMs of a plurality of PMs, getting a routing path between the pair of PMs and a first corresponding event set of the pair of PMs; and for each pair of a PM of the plurality of PMs and a physical storage (PS) of at least one physical storage, getting a second corresponding event set of the PM and the PS.

10. The method as claimed in claim 1, wherein said PM-level dependency is a PM communication topology, and the group of event sets is generated by using the PM communication topology.

11. A system for analyzing root causes of relating performance issues among virtual machines (VMs) to physical machines (PMs), configured in physical data center, and comprising:
- a processor;
- a first server and a system module that finds an application-level dependency in one or more VMs running on a plurality of PMs in the physical data center, and generates an application-level topology with anomaly, wherein said first server at least includes an application-level anomaly detection module, and said system module is integrated within a hypervisor;
- a link provided to communicate between at least two VMs such that applications running on the at least two VMs communicate with each other, and
- a second server that includes at least an abstraction module and an event generation and prioritization module, wherein said abstraction module abstracts the application-level topology with anomaly to a VM-level dependency, and then transfers the VM-level dependency to a PM-level dependency, and said event generation and prioritization module gets a PM communication topology, generates a group of event sets by using the PM communication topology, and produces a prioritized event list by prioritizing the group of event sets,
- wherein a number of event sets in the group of event sets is equal to a number of links in the PM communication topology.

12. The system as claimed in claim 11, wherein said system is integrated in a physical data center management system module to continuously monitor the plurality of PMs, and one or more physical devices in the physical data center.

13. The system as claimed in claim 11, wherein the system further includes at least one repository to keep a first information of a routing path between each pair of the plurality of PMs, and a second information of at least one routing path between each of the plurality of PMs and each of one or more physical devices.

14. The system as claimed in claim 12, wherein each event in the prioritized event list associates a physical device of the one or more physical devices in the physical data center, and has an associated message corresponding to a hardware issue to the physical device.

15. The system as claimed in claim 11, wherein the abstraction module gets an information of one or more used virtual volumes for the one or more VMs from at least one repository, for abstracting the application-level topology with anomaly to the VM-level dependency.

16. The system as claimed in claim 11, wherein the abstraction module gets an information of the plurality of PMs and one or more physical storages from at least one repository, for abstracting the VM-level dependency to the PM-level dependency.

17. The system as claimed in claim 11, wherein the event generation and prioritization module gets a routing path between each pair of PMs of the plurality of PMs for generating a plurality of events corresponding to a plurality of physical devices over the routing path.

18. The system as claimed in claim 11, wherein the abstraction module transfers the VM-level dependency to the PM communication topology.

* * * * *